United States Patent
Lu et al.

(10) Patent No.: US 10,636,181 B2
(45) Date of Patent: Apr. 28, 2020

(54) GENERATION OF GRAPHS BASED ON READING AND LISTENING PATTERNS

(71) Applicant: International Business Machines Corporation, Armonk, NY (US)

(72) Inventors: Fang Lu, Billerica, MA (US); Jana H. Jenkins, Raleigh, NC (US); Joseph Lam, Markham (CA); Hau Co, Sharon (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/013,808

(22) Filed: Jun. 20, 2018

(65) Prior Publication Data

US 2019/0392616 A1    Dec. 26, 2019

(51) Int. Cl.
  *G06T 11/20*    (2006.01)
  *G10L 25/51*    (2013.01)
  *G06F 17/27*    (2006.01)
  *G06F 3/01*     (2006.01)

(52) U.S. Cl.
  CPC ............ *G06T 11/206* (2013.01); *G06F 3/013* (2013.01); *G06F 17/27* (2013.01); *G10L 25/51* (2013.01)

(58) Field of Classification Search
  CPC .................................................... G06T 11/206
  USPC ......................................................... 345/440
  See application file for complete search history.

(56) References Cited

U.S. PATENT DOCUMENTS

| 8,291,372 | B2 | 10/2012 | Dangeville et al. |
| 8,434,867 | B2 | 5/2013 | Helfman et al. |
| 9,275,029 | B2 | 3/2016 | Padgett et al. |
| 9,304,584 | B2 | 4/2016 | Greenspan et al. |
| 9,507,480 | B1 | 11/2016 | Hui et al. |
| 2012/0131491 | A1 | 5/2012 | Lee |
| 2014/0325407 | A1 | 10/2014 | Morris et al. |
| 2019/0005841 | A1* | 1/2019 | Loi .............. G09B 19/00 |

FOREIGN PATENT DOCUMENTS

| CN | 101567004 B | 5/2012 |
| WO | 2016058847 | 4/2016 |

OTHER PUBLICATIONS

Mell et al., "Effectively and Securely Using the Cloud Computing Paradigm" dated Oct. 7, 2009, NIST, Information Technology Laboratory, Total 80 pages.

Mell et al., "The NIST Definition of Cloud Computing" dated Sep. 2011, Recommendations of the National Institute of Standards and Technology, Computer Security Division Information Technology Laboratory, Total 7 pages.

* cited by examiner

*Primary Examiner* — Shivang I Patel
(74) *Attorney, Agent, or Firm* — Janaki K. Davda; Konrad, Raynes, Davda and Victor LLP

(57) ABSTRACT

Provided are techniques generating graphs based on reading and listening patterns. Key concepts of a content item are identified using text analysis. Focus elements that are focused on by a consumer of the content item are identified. The key concepts are compared with the focus elements to identify overlapping elements. A graph that includes components is generated with the overlapping elements, wherein the graph reflects understanding of the content item from a perspective of the consumer. The components are modified based on component identifiers. The graph is provided to one or more users.

18 Claims, 11 Drawing Sheets

500

- Build a chatbot project by using a cognitive software assistant

- Chatbot projects that use cognitive software assistant involve three phases: scope, design, and integrate.

- In the scope phase, you gather requirements for the conversation and how customers support the use case today. They might have a script, coded procedures, or other artifacts.

- You define personas, create an empathy map, and build a system context diagram. Then, you extract the potential list of intents. Intents are the purposes or goals that are expressed in a user's input, such as answering a question or processing a payment. After you define intents, you assess the sentences that lead to those intents.

- In the design phase, you create an instance of the cognitive software assistant and use its builder tool to define the intents and the entities. An entity represents a class of object or data type that is relevant to a user's purpose. At the end of the design phase, you start the dialog flow and unit-test it.

- Finally, in the integrate phase, you develop the web app or microservice that interacts with the cognitive software assistant. You implement the business logic to handle the conversation context, and add other components to complement the business requirements.

- Scope gather requirements define personas create empathy map build system context diagram.
- Design create cognitive software assistant start dialog flow unit-test
- Integrate develop web app implement business logic add other components.

FIG. 5B

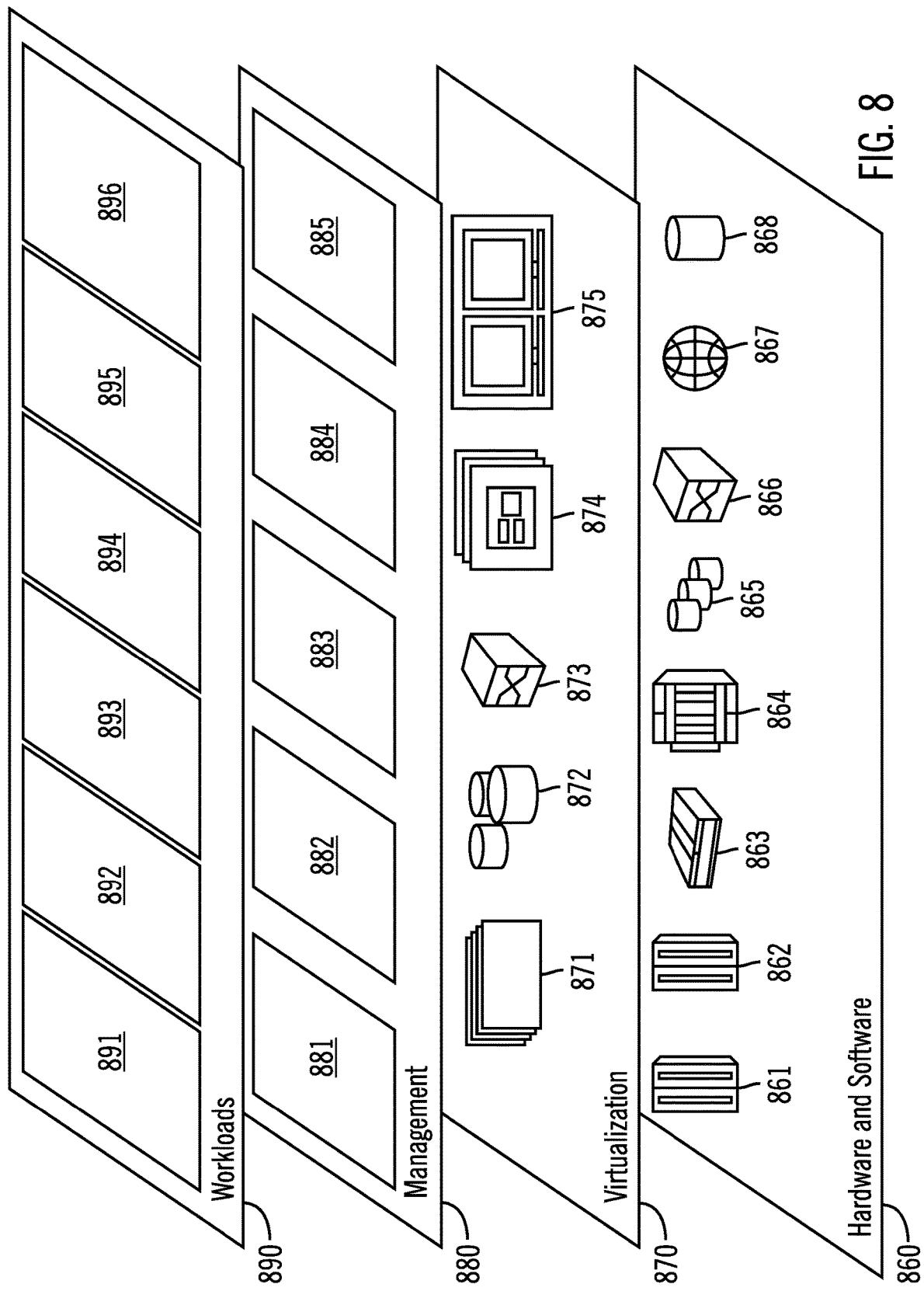

GENERATION OF GRAPHS BASED ON READING AND LISTENING PATTERNS

FIELD

Embodiments of the invention relate to generating graphs based on reading and listening patterns.

BACKGROUND

A user may read information from documents on a computer screen. Users today have access to a great deal of information in many documents. Sometimes, it is challenging to digest a lot of information quickly. Also, it may be difficult for the user to go back later and identify important information in the documents.

SUMMARY

In accordance with embodiments, a computer-implemented method is provided for generating graphs based on reading and listening patterns. The computer-implemented method comprises: identifying key concepts of a content item using text analysis; identifying focus elements that are focused on by a consumer of the content item; comparing the key concepts with the focus elements to identify overlapping elements; generating a graph comprising components with the overlapping elements that reflects understanding of the content item from a perspective of the consumer; modifying the components based on component identifiers; and providing the graph to one or more users.

In accordance with other embodiments, a computer program product is provided for generating graphs based on reading and listening patterns. The computer program product comprising a computer readable storage medium having program code embodied therewith, the program code executable by at least one processor to perform operations comprising: identifying key concepts of a content item using text analysis; identifying focus elements that are focused on by a consumer of the content item; comparing the key concepts with the focus elements to identify overlapping elements; generating a graph comprising components with the overlapping elements that reflects understanding of the content item from a perspective of the consumer; modifying the components based on component identifiers; and providing the graph to one or more users.

In yet other embodiments, a computer system is provided for generating graphs based on reading and listening patterns. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: identifying key concepts of a content item using text analysis; identifying focus elements that are focused on by a consumer of the content item; comparing the key concepts with the focus elements to identify overlapping elements; generating a graph comprising components with the overlapping elements that reflects understanding of the content item from a perspective of the consumer; modifying the components based on component identifiers; and providing the graph to one or more users.

BRIEF DESCRIPTION OF THE SEVERAL VIEWS OF THE DRAWINGS

Referring now to the drawings in which like reference numbers represent corresponding parts throughout:

FIG. 5A illustrates text that a consumer reads to understand how to build a chatbot project by using a cognitive software assistant in accordance with certain embodiments.

FIG. 5B illustrates key concepts and metadata in accordance with certain embodiments.

FIG. 8 illustrates abstraction model layers in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As the saying goes, a picture is worth a thousand words. Thus, embodiments, generate flow diagrams or similar easy-to-understand graphs from information in content items for a consumer to understand the information and even share this information with others easily from the consumer's reading or listening perspective (rather than from the author's perspective). The consumer may be a reader or a listener or may otherwise "consume" (e.g., view) the content item.

Figure 1:
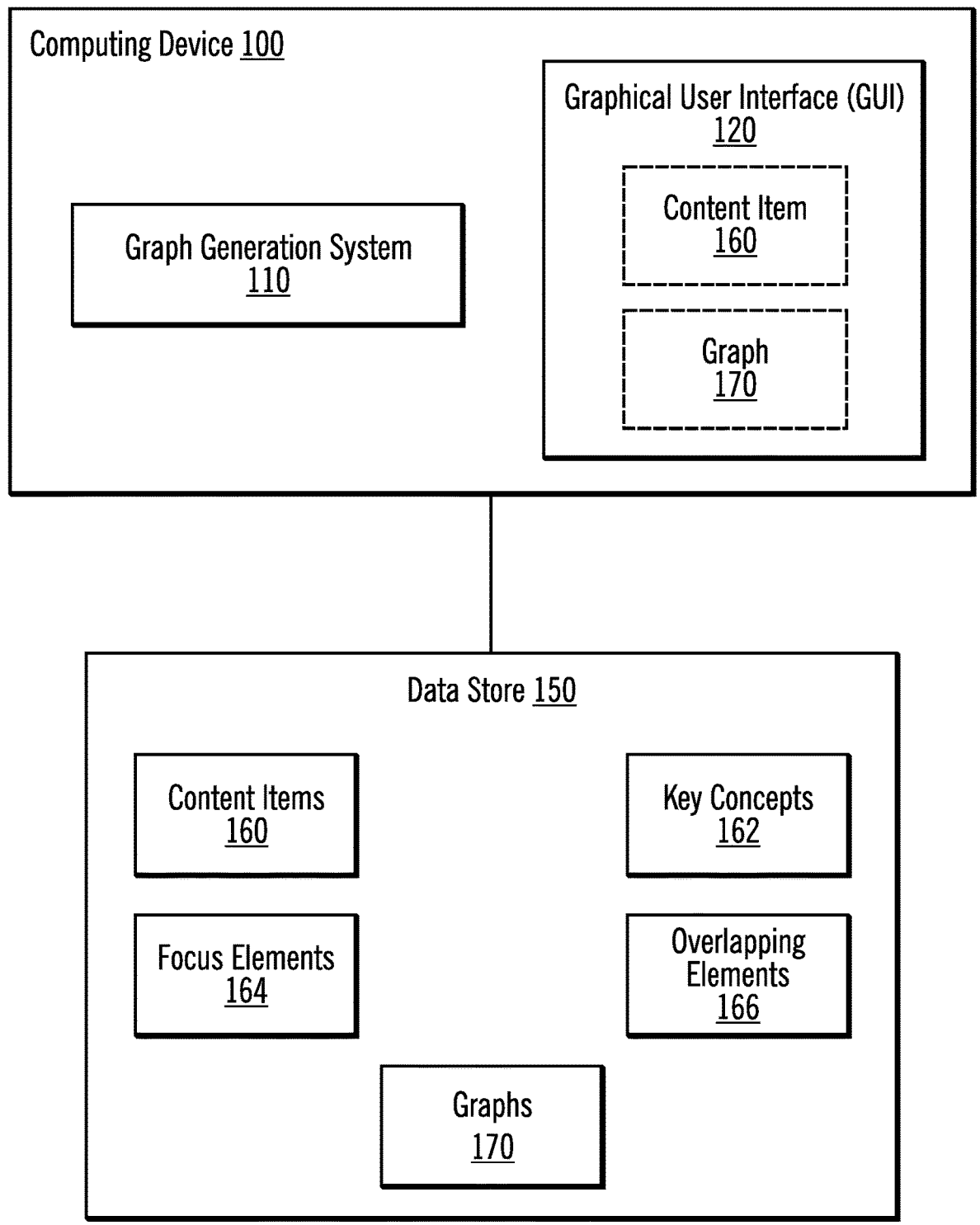
FIG. 1 illustrates, in a block diagram, a computing environment in accordance with certain embodiments.

FIG. 1 illustrates, in a block diagram, a computing environment in accordance with certain embodiments. A computing device 100 includes a Graph Generation System 110 and a Graphical User Interface (GUI) 120. The computing device 100 is coupled to a data store 150. The data store 150 stores content items 160 and graphs 170. The content items 160 include, for example, documents, audio files, video files, etc. The documents include, for example, web pages, newspaper articles, etc. The data store 150 also stores key concepts 162 of a content item 160, focus elements 164 that a consumer focused on for the content item 160, and overlapping elements 166 that represent overlapping key concepts and focus elements for the content item 160.

With embodiments, the computer 100 and the data store 150 are part of a network that allows the computer 100 to access additional content items on the Internet, on an intranet, in other data stores, etc. The graph generation system 110 tracks a consumer's reading pattern while the consumer is reading a content item 160 (e.g., a document)

displayed in the GUI 120 and tracks a consumer's listening pattern while the consumer is listening to a content item 160 (e.g., an audio of text in the document) being played in the GUI 120. Using the reading pattern and/or the listening pattern, the graph generation system 110 generates a graph representing portions of the content item 160 that appear to have generated the most interest from the consumer (reader or listener) and reflects the consumer's understanding (i.e., comprehension) of the content item 160.

The graph generation system 110 automatically generates a flow diagram or similar chart from the text the consumer reads based on the consumer's eye tracking patterns. Also, the graph generation system 110 automatically generates a flow diagram or similar chart from audio in an audio file that the consumer is listening to. With embodiments, the audio may be text voiced by audio devices, text voiced by a screen reader type of software, an audio file, a video file, etc. The graph generation system 110 generates the graph from the reader's perspective (rather than from the author's perspective).

The graph generation system 110 also utilizes legends and extracted key terms from on-line help documents to label the components of the graph (e.g., the boxes of the flow diagram). The generated graph 170 may be shared with others to reflect the reader's or listener's information process patterns.

In certain embodiments, the graph generation system 110 assigns predefined component identifiers (e.g., colors, shapes, etc.) to the components in the graph. In other embodiments, the graph generation system 110 assigns different component identifiers (e.g., colors, shapes, etc.) to different readers or listeners based on consumer preferences.

Figure 2:
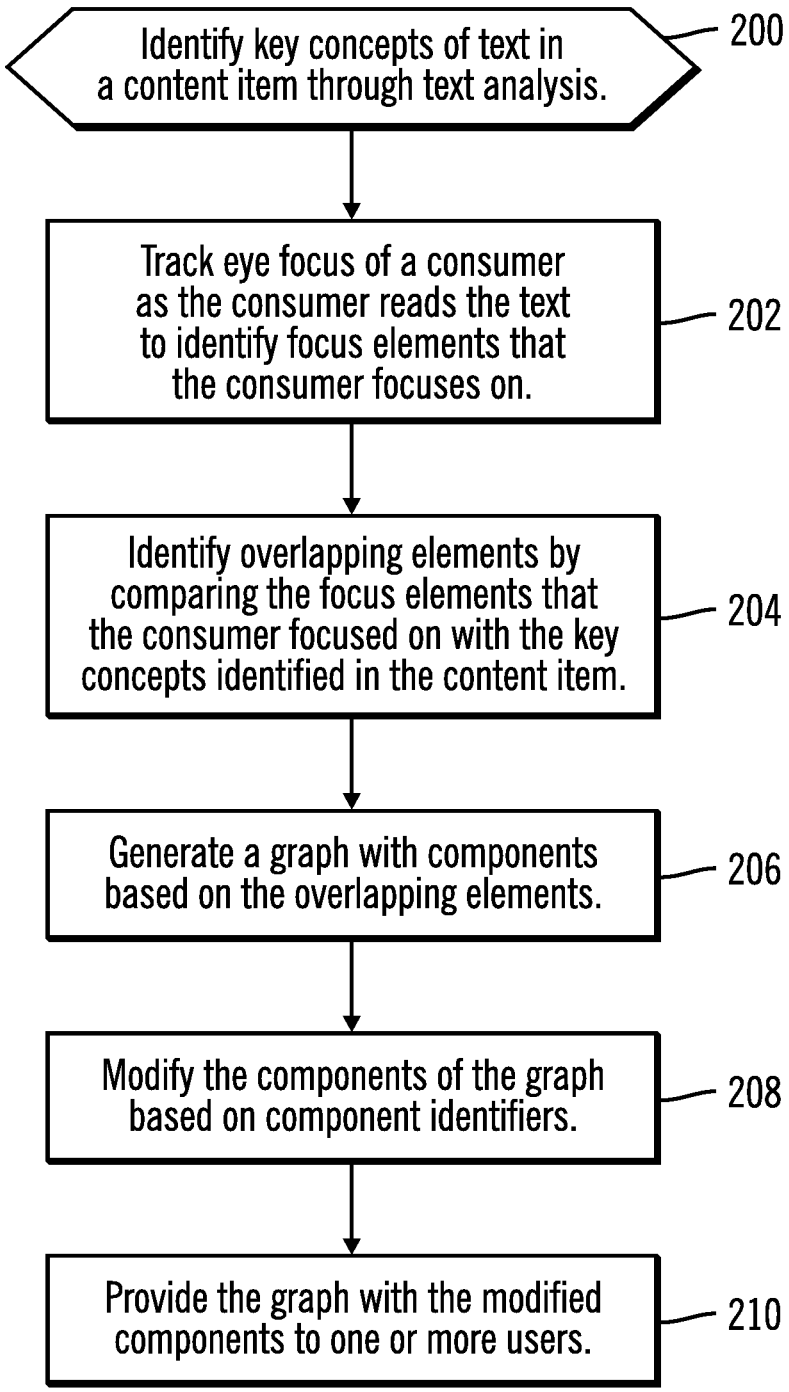
FIG. 2 illustrates, in a flow chart, operations for generating a graph for a consumer who is a reader in accordance with certain embodiments.

FIG. 2 illustrates, in a flow chart, operations for generating a graph for a consumer who is a reader in accordance with certain embodiments. Control begins at block 200 with the graph generation system 110 identifying key concepts in a content item through text analysis. The key concepts may be topics or phrases of the content item. The key concepts may be described as core concepts, core meanings, fundamental concepts, focus points or key terminologies of the content item. In certain embodiments, the key concepts are identified using natural language processing of the text.

In block 202, the graph generation system 110 tracks eye focus of a consumer as the consumer reads the content item to identify focus elements that the consumer focuses on. In certain embodiments, the graph generation system 110 is integrated with eye tracking devices that capture the consumer's eye focus on a display screen of the computing device 100 when the consumer is reading. In block 204, the graph generation system 110 identifies overlapping elements by comparing the focus elements that the consumer focused on with the key concepts identified in the content item. In certain embodiments, these overlapping elements indicate a reading pattern.

In block 206, the graph generation system 110 generates a graph based on the overlapping elements.

In block 208, the graph generation system 110 modifies the components of the graph based on component identifiers.

In block 210, the graph generation system 110 provides the graph with the modified components to one or more users (e.g., the consumer reading the content item or other consumers). For example, the graph may be displayed to the consumer reading the content item or another user. As another example, the graph may be stored in a file that is sent to one or more users (e.g., the consumer reading the content item or other consumers).

Figure 3:
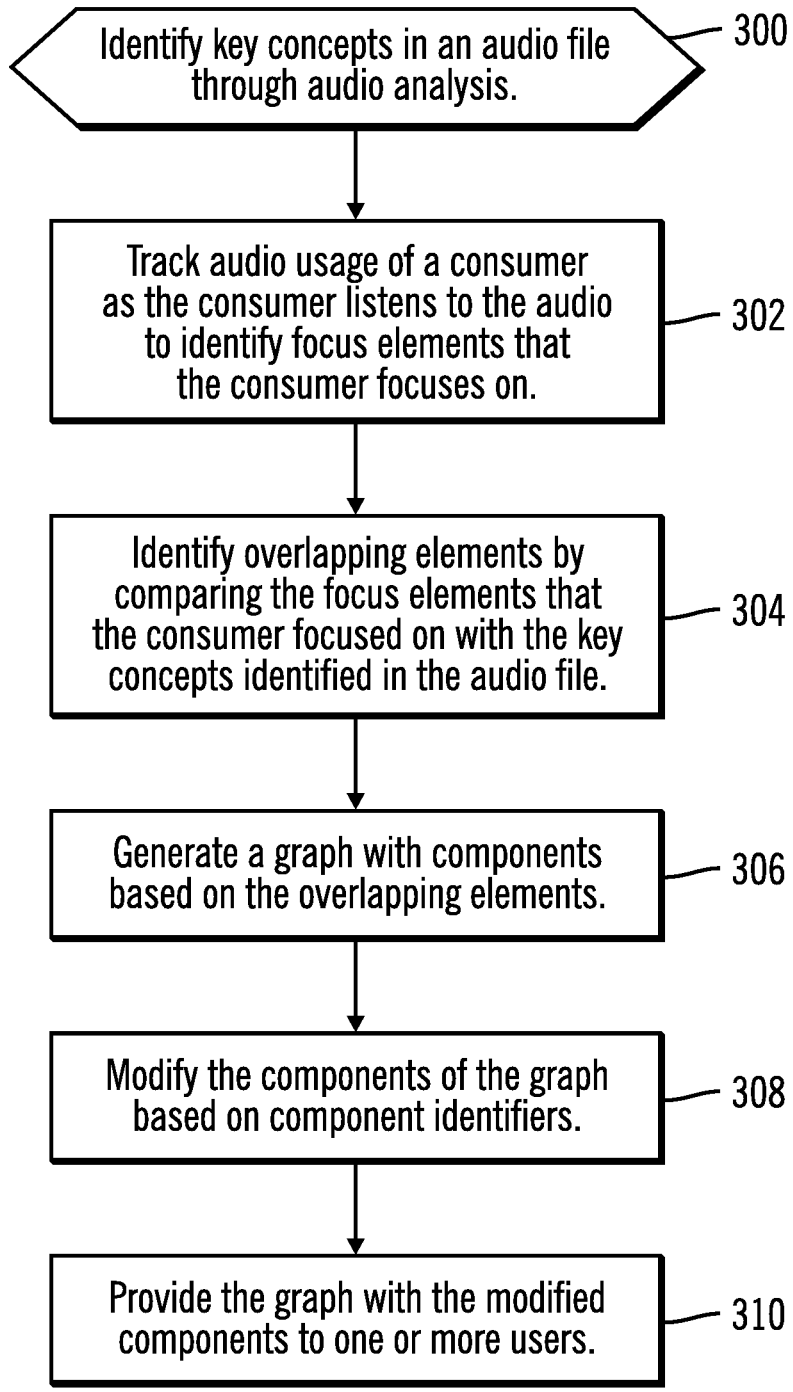
FIG. 3 illustrates, in a flow chart, operations for generating a graph for a consumer who is a listener in accordance with certain embodiments.

FIG. 3 illustrates, in a flow chart, operations for generating a graph for a consumer who is a listener in accordance with certain embodiments. Control begins at block 300 with the graph generation system 110 identifying focus elements in an audio file, which is a type of content item. The key concepts may be topics or phrases of the audio file. The key concepts may be described as core concepts, core meanings, fundamental concepts, focus points or key terminologies of the audio file. In certain embodiments, the audio in the audio file is converted to text for text analysis. In certain embodiments, the key concepts are identified using natural language processing of the text.

In block 302, the graph generation system 110 tracks audio usage of a consumer as the consumer listens to the audio to identify key concepts that the consumer focuses on. The tracking may keep track of when the consumer pauses, rewinds, and replays certain segments of the audio.

In block 304, the graph generation system 110 identifies overlapping elements by comparing the focus elements that the consumer focused on with the key concepts identified in the audio file. In certain embodiments, these overlapping elements indicate a listening pattern.

In block 306, the graph generation system 110 generates a graph with components based on the overlapping elements.

In block 308, the graph generation system 110 modifies the components of the graph based on component identifiers.

In block 310, the graph generation system 110 provides the graph with the modified components to one or more users (e.g., the consumer listening to the audio or other consumers). For example, the graph may be displayed to the consumer listening to the audio or may be provided to another user. As another example, the graph may be stored in a file that is sent to one or more users (e.g., the consumer listening to the audio or other consumers).

Figure 4A:
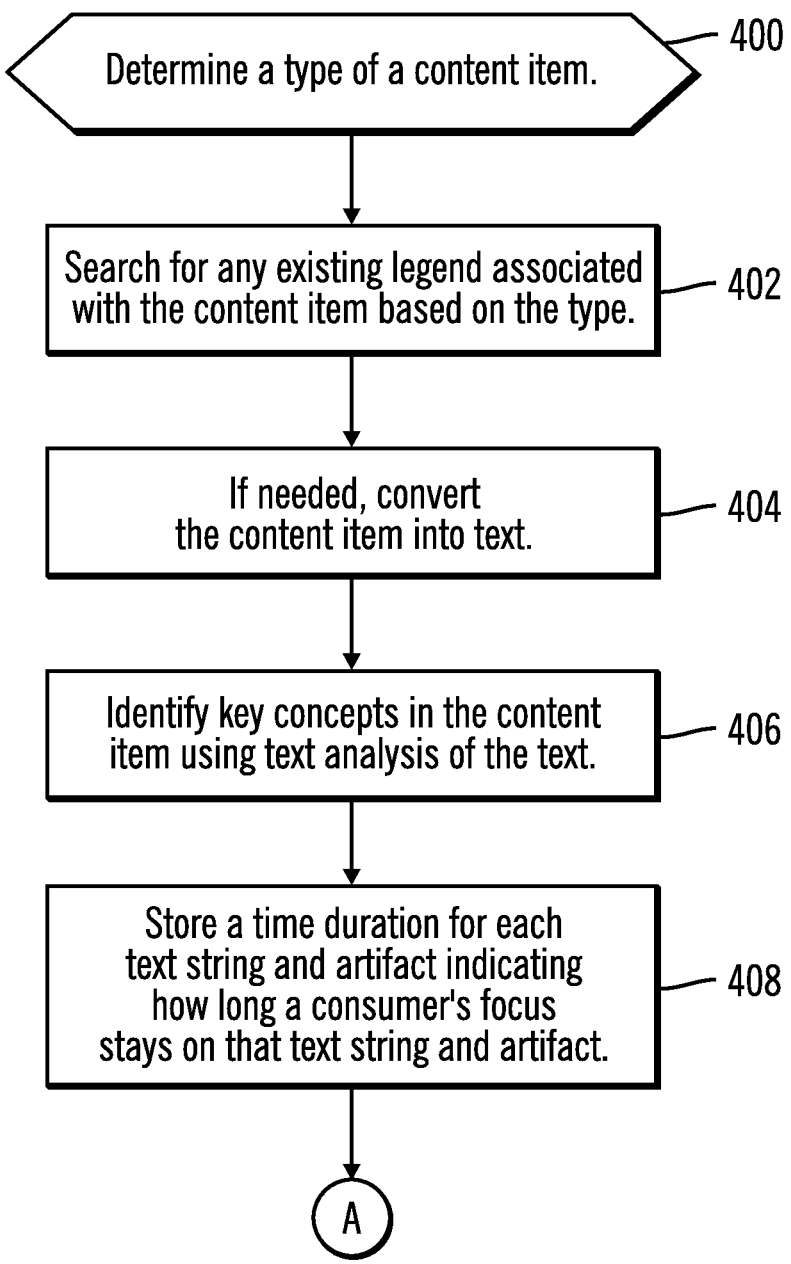
FIGS. 4A and 4B illustrate, in a flow chart, detailed operations for generating a graph in accordance with certain embodiments.
Figure 4B:
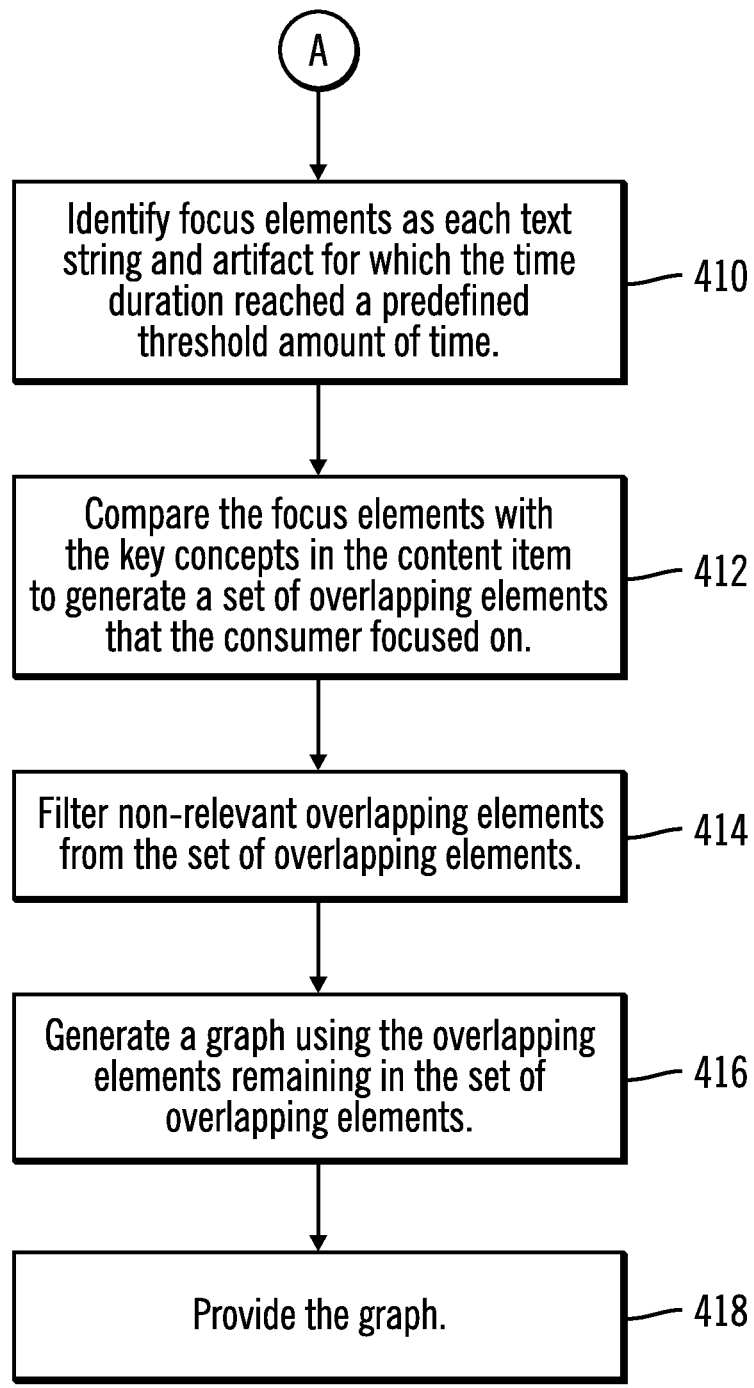

FIGS. 4A and 4B illustrate, in a flow chart, detailed operations for generating a graph in accordance with certain embodiments. In block 400, the graph generation system 110 determines a type of a content item. For example, the content item may be text, an image, a map, etc.

In block 402, the graph generation system 110 searches for any existing legend associated with the content item based on the type. For example, the legend may be a table of contents for text, an index for text, a legend for an image, a legend for a map, etc. In this manner, the type of content item may influence the type of legend that the graph generation system 110 searches for.

In block 404, the graph generation system 110, if needed, converts the content item into text. For example, if the content item is an audio file, the graph generation system 110 converts the audio in the audio file into text. As another example, the graph generation system 110 uses Optical Character Recognition (OCR) technology to covert an image of text into text that may be analyzed using text analysis.

In block 406, the graph generation system 110 identifies key concepts in the content item using text analysis of the text.

In block 408, the graph generation system 110 stores a time duration for each text string and artifact indicating how long a consumer's focus stays on that text string and artifact. An artifact may be described as a text string or an image. From block 408 (FIG. 4A), processing continues to block 410 (FIG. 4B).

In block 410, the graph generation system 110 identifies focus elements as each text string and artifact for which the time duration reached a predefined threshold amount of time. With various embodiments, the predefined thresholds may be different based on different factors. For example, factors include how much time the consumer has looked at an artifact or how many details the consumer wants to include in the graph.

In block 412, the graph generation system 110 compares the focus elements with the key concepts in the content item to generate a set of overlapping elements that the consumer focused on.

In block 414, the graph generation system 110 filters non-relevant overlapping elements from the set of overlapping elements. That is, the graph generation system 110 filters non-relevant information from data collected from the consumer's eye focus. Non-relevant information may be any information that is not related to the key concepts of the content item.

In block 416, the graph generation system 110 generates a graph using the overlapping elements remaining in the set of overlapping elements. In block 418, the graph generation system 110 provides (e.g., displays) the graph (e.g., to one or more users). The graph may be displayed adjacent to the content item in the GUI 120, may be displayed separately from the content item in the GUI, may be saved to a text file or to an audio file, etc.

In certain embodiments, the graph generation system 110 builds a flow diagram using the key concepts remaining in the set of key concepts that the consumer has focused on for more than the predetermined threshold amount of time. The graph generation system 110 may also use other existing information that may be extracted from the original content item (e.g., a map or graph legend) may located on-line help text to label the components of the flow diagram. The graph generation system 110 may assign component identifiers (e.g., colors, shapes, etc.) to the components of the flow diagram. The selection of the component identifiers may be based on predefined rules or may be based on the meaning of the components.

In certain alternative embodiments, the component identifiers (e.g., colors, shapes, etc.) generates other types of graphs, such as chart or tables.

With embodiments, the same graph may be shared with other users to reflect one consumer's reading or listening process. This may help the other users understand why the one consumer may comment on the content item in certain way.

With embodiments, the graph generation system 110 is extended to the listening patterns when the consumer listens to the content item via audio devices or screen reader type of software. For example, the consumer may pause, rewind, replay certain segments of the audio when listening using an audio button or using a screen reader type of software to listen to the text.

In certain embodiments, the graph generation system 110 generates the finalized graph from the reader's or listener's perspective and presents the graph to the consumer.

Merely to enhance understanding, some example use cases are provided, but embodiments are not to be limited to such example use cases.

For a first example use case, a consumer learns how to build a chatbot project by using a cognitive software assistant six months ago. The consumer utilized the graph generation system 110 to capture the key concepts from the content item the consumer read. The consumer put that project on the side for a while and needs to have a refresher. The consumer opened the flow diagrams and remembered the key concepts of the workflow.

Figure 5C:
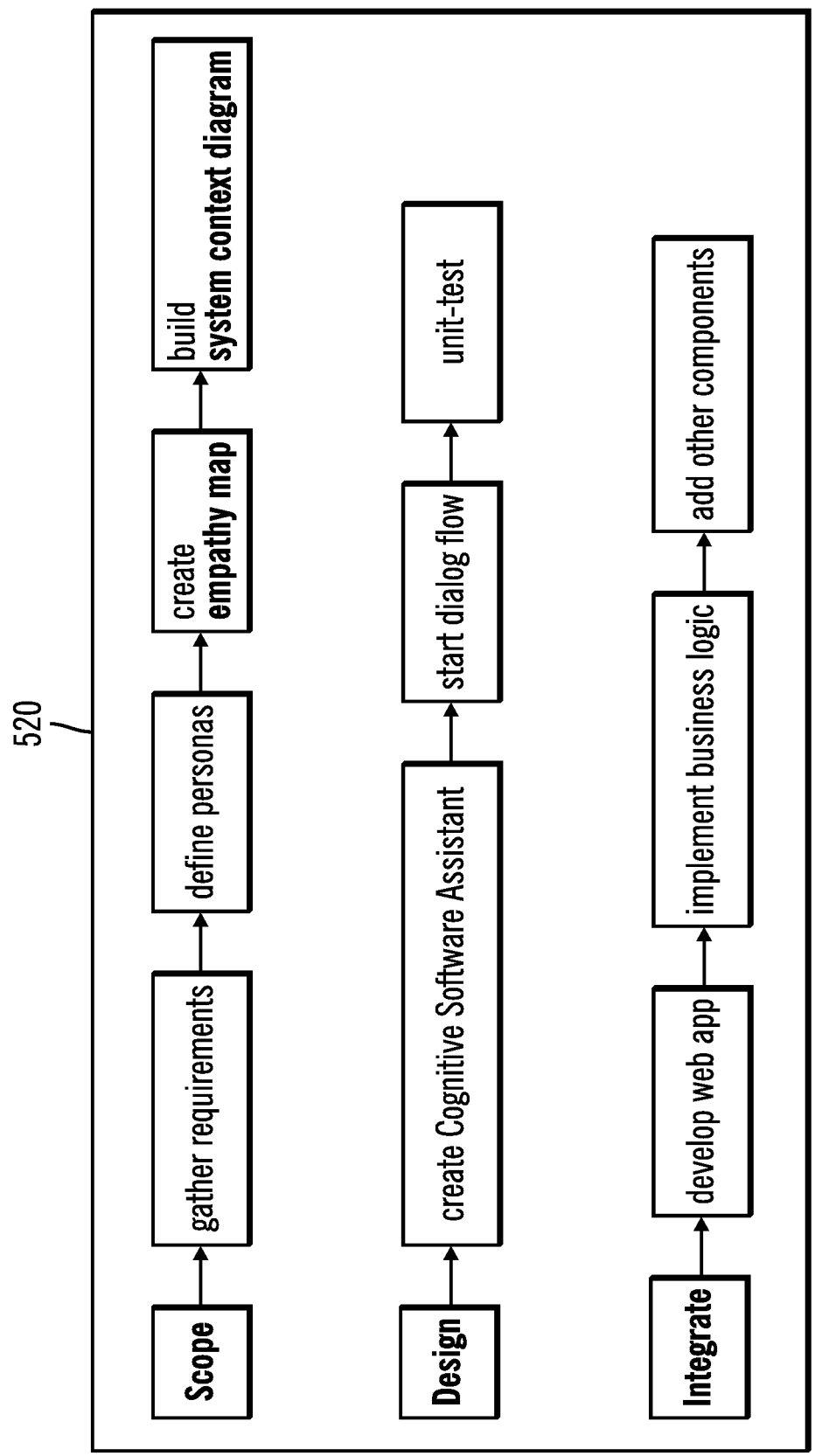
FIG. 5C illustrates a graph in accordance with certain embodiments.

FIGS. 5A, 5B, and 5C illustrate the first use case in accordance with certain embodiments. FIG. 5A illustrates text 500 that the consumer reads to understand how to build a chatbot project by using the cognitive software assistant in accordance with certain embodiments. FIG. 5B illustrates key concepts and metadata 510 in accordance with certain embodiments. In particular, the graph generation system 110 monitors the consumer's eye gazing patterns and facial expressions; records the time the consumer's eyes focused on the text strings for more than a predetermined threshold of time; and records this information in the metadata that maps to the text strings. FIG. 5C illustrates a graph 520 in accordance with certain embodiments. In particular, the graph generation system 110 converts the metadata into the graph 520 where it shows the important key points from the consumer's reading patterns.

For a second example use case, a consumer is a development technology lead who is presenting a speech on how to use the new web service development framework to build a Proof of Concept (POC) for potential customers. The consumer has done research and read some very useful tutorials. The graph generation system 110 generated a flow diagram based on the consumer's reading patterns. The consumer also watched some on-line tutorial videos with good examples. The graph generation system 110 also generated additional flow diagrams based on consumer's viewing and listening patterns of the video. The consumer was called to work on an urgent customer issue, so the consumer shared these flow diagrams with teammates so that they could understand the key operations of using this new web service development framework.

For a third example use case, a consumer designing a user interface is able to better understand patterns across multiple consumers, which will help provide guidelines for the user interface design. For example, the graph generation system 110, while tracking eye focus of different consumers, determines that a consumer reading speed declines after a certain number of text lines and length of text width. This may help application/web writers craft copy within a defined limit. This will ensure that anything at or below this limit will provide the core components the author wants to communicate and will be understood by the consumer. Also, the graph generation system 110, while tracking eye focus of different consumers, determines that rapid eye movement over a graph may indicate a lack of understanding or confusion. This may help to conclude that certain types of graphs are difficult to comprehend by certain consumers and by using this type of graph, it may take a certain amount of time before the graph is understood by the consumer. The graph generation system 110 determines that eye movement may help determine what elements on a screen are found or not found by a consumer. This may help to refine the interface layout and help determine which areas of the screen are ideal for primary elements versus secondary/triarchy elements.

Continuing with the user interface example, the guidelines may be further defined by the consumer's gender, age, and culture. This will allow the application/web design be more tailored based on demographics. For example, people of an older age may better read when text on screen are larger. The guidelines may provide text line limits and length of text width based on age. The guidelines may determine what types diagram/visual are easier to comprehend based on age. Regarding culture, the guidelines may indicate that consumers who normally read right-to-left read faster using a serif font versus a san-serif font; or that consumers who read from top-to-bottom have a hard time navigating a page that is has a screen height larger than 900 pixels. Regarding age, flow diagram patterns may indicate using pink as a theme color on male specific commerce websites result in higher volumes of purchases.

Thus, common flow diagram patterns may help validate or invalidate approaches on how people learn. The flow diagram patterns may also result in findings that demonstrate a new or different way in which people learn, hence, providing a new approach on how to structure information.

The graph generation system 110 creates a graph by determining focus elements of interest for a consumer while the consumer is reading or listening to a document for making notes with important points based on the reader's or listener's perspective. The graph generation system 110 captures readers focus on a display screen by using eye movement tracking and storing the time duration of consumer's eye focus on text strings or other artifacts within the document to determine the focus elements of the document.

The graph generation system 110 determines key concepts of a document based on natural language processing. The graph generation system 110 then determines overlapping elements based on similarities between the focus elements and the key concepts.

The graph generation system 110 improves productivity of, for example, collaborators or co-workers, as the generation process happens in the background seamlessly without any user (e.g., consumer) intervention.

The graph generation system 110 also helps a consumer present a topic (e.g., one that the consumer is not familiar with). The graph generation system 110 also helps build a graph with concrete information with meaningful representations for the consumer to use later on as references.

The graph generation system 110 generates a personalized flow diagram to reflect the reader's or listener's key thinking process to interpret the document.

The graph generation system 110 solves problems of conventional systems and enables a consumer to digest a lot of information in content items quickly and to go back later and identify important information in the content items.

Figure 6:
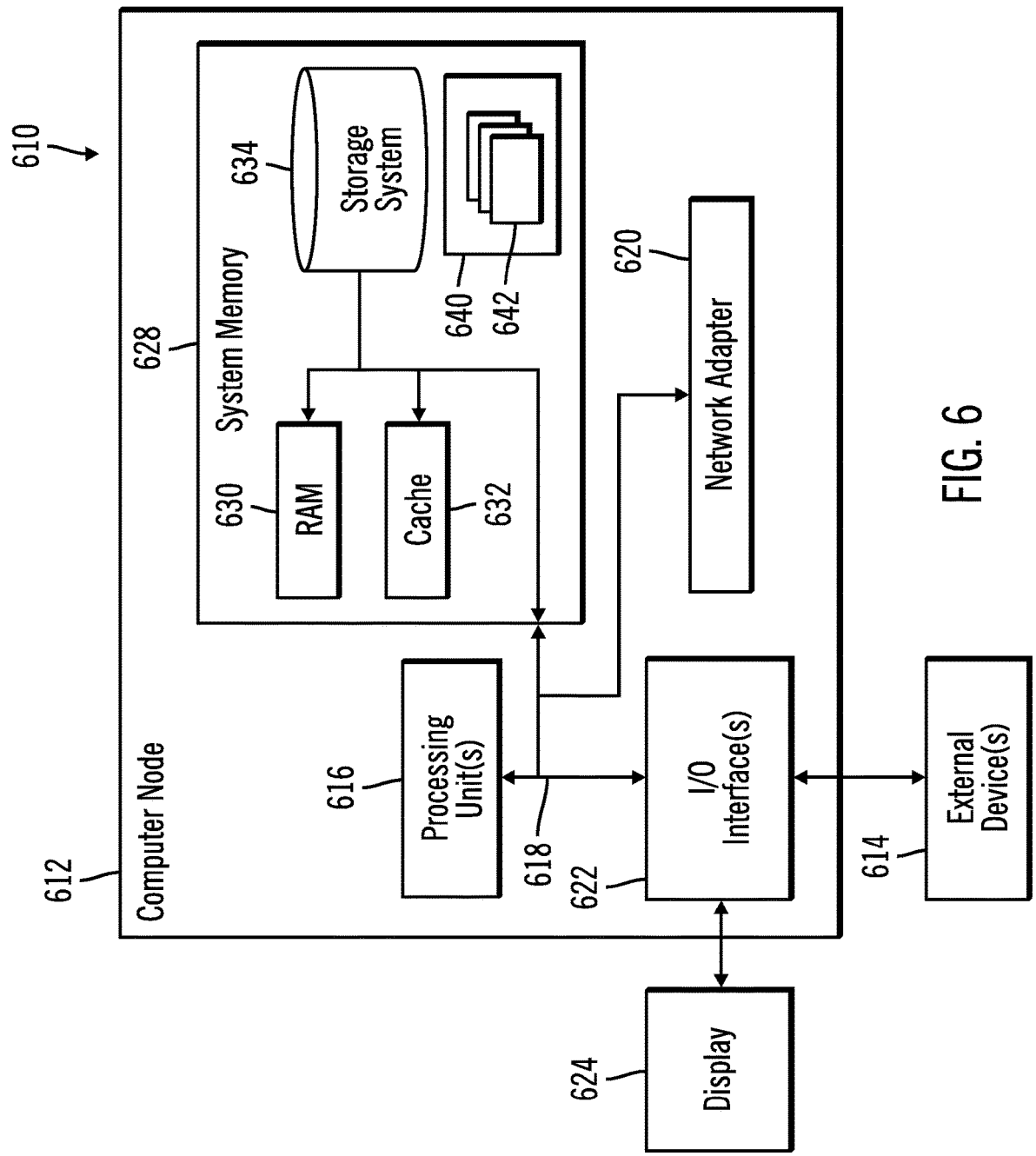
FIG. 6 illustrates a computing node in accordance with certain embodiments.

FIG. 6 illustrates a computing environment 610 in accordance with certain embodiments. In certain embodiments, the computing environment is a cloud computing environment. Referring to FIG. 6, computer node 612 is only one example of a suitable computing node and is not intended to suggest any limitation as to the scope of use or functionality of embodiments of the invention described herein. Regardless, computer node 612 is capable of being implemented and/or performing any of the functionality set forth hereinabove.

The computer node 612 may be a computer system, which is operational with numerous other general purpose or special purpose computing system environments or configurations. Examples of well-known computing systems, environments, and/or configurations that may be suitable for use with computer node 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 612 may be described in the general context of computer system executable instructions, such as program modules, being executed by a computer system. Generally, program modules may include routines, programs, objects, components, logic, data structures, and so on that perform particular tasks or implement particular abstract data types. Computer node 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer node 612 is shown in the form of a general-purpose computing device. The components of computer node 612 may include, but are not limited to, one or more processors or processing units 616, a system memory 628, and a bus 618 that couples various system components including system memory 628 to one or more processors or processing units 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 612 typically includes a variety of computer system readable media. Such media may be any available media that is accessible by computer node 612, and it includes both volatile and non-volatile media, removable and non-removable media.

System memory 628 can include computer system readable media in the form of volatile memory, such as random access memory (RAM) 630 and/or cache memory 632. Computer node 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, system memory 628 may include at least one program product having a set (e.g., at least one) of program modules that are configured to carry out the functions of embodiments of the invention.

Program/utility 640, having a set (at least one) of program modules 642, may be stored in system memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer node 612 may also communicate with one or more external devices 614 such as a keyboard, a pointing device, a display 624, etc.; one or more devices that enable a user to interact with computer node 612; and/or any devices (e.g., network card, modem, etc.) that enable computer node 612 to communicate with one or more other computing devices. Such communication can occur via Input/Output (I/O) interfaces 622. Still yet, computer node 612 can communicate with one or more networks such as a local area network (LAN), a general wide area network (WAN), and/or a public network (e.g., the Internet) via network adapter 620. As depicted, network adapter 620 communicates with the other components of computer node 612 via bus 618. It should be understood that although not shown, other hardware and/or software components could be used in conjunction with computer node 612. Examples, include, but are not limited to: microcode, device drivers, redundant processing units, external disk drive arrays, RAID systems, tape drives, and data archival storage systems, etc.

In certain embodiments, the computing device 100 has the architecture of computer node 612. In certain embodiments, the computing device 100 is part of a cloud infrastructure. In certain alternative embodiments, the computing device 100 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
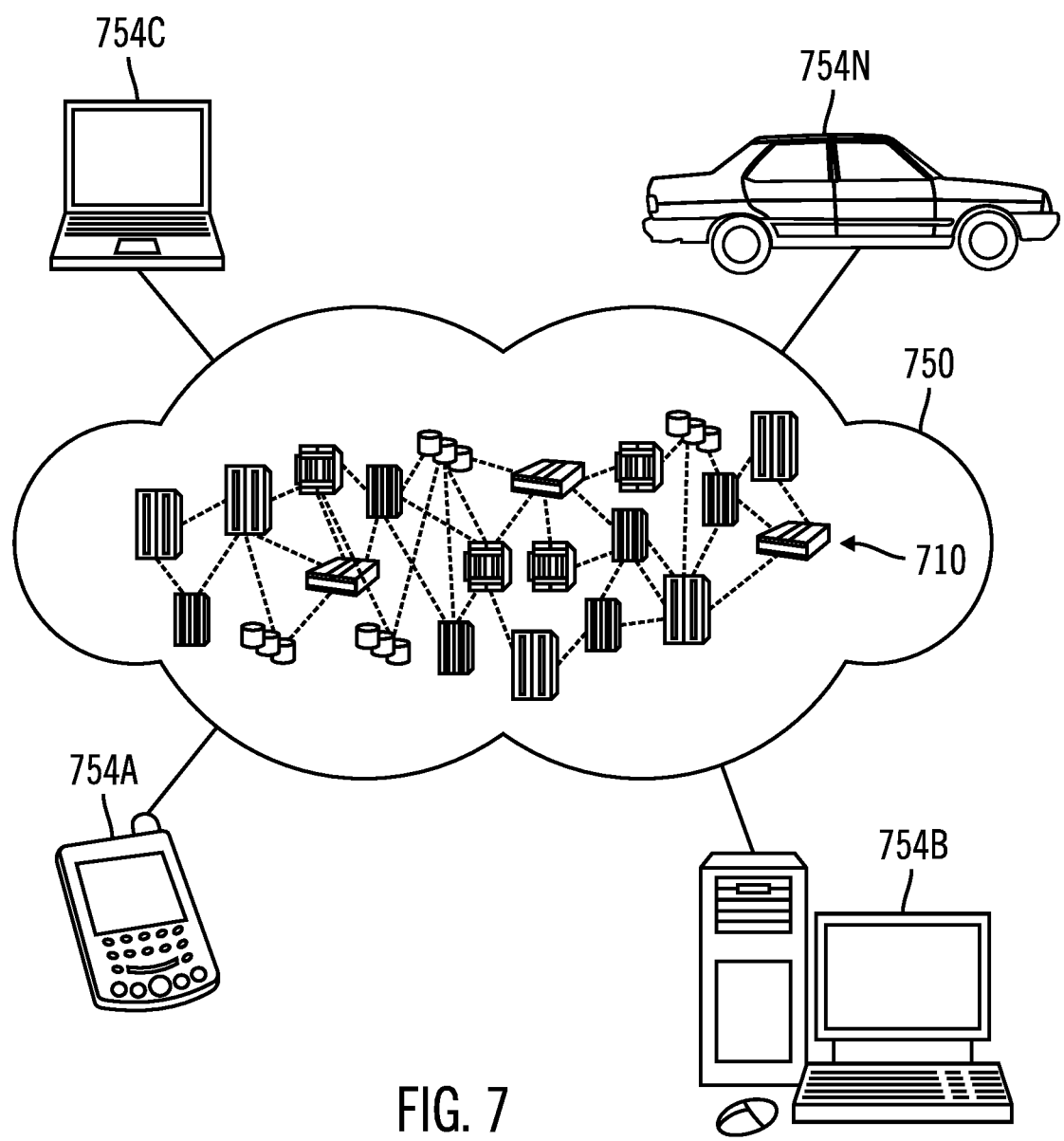
FIG. 7 illustrates a cloud computing environment in accordance with certain embodiments.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and generation of graphs based on reading and listening patterns 896.

Thus, in certain embodiments, software or a program, implementing generation of graphs based on reading and listening patterns in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
    identifying key concepts of a content item using text analysis, wherein the key concepts comprise topics;
    storing a time duration for each text string indicating how long a focus of a consumer stays on that text string;
    identifying focus elements that are focused on by the consumer, wherein the focus elements comprise text strings for which the time duration reached a predefined threshold amount of time;
    comparing the key concepts with the focus elements to identify overlapping elements;
    generating a graph comprising components with the overlapping elements that reflects understanding of the content item from a perspective of the consumer;
    modifying the components based on component identifiers, wherein the component identifiers are any of shapes and colors for the components; and
    providing the graph and the content item to one or more users.

2. The computer-implemented method of claim 1, further comprising:
    in response to the consumer being a reader, tracking eye focus of the reader to identify the focus elements.

3. The computer-implemented method of claim 1, further comprising:
    in response to the consumer being a listener, tracking use of pause, rewind, and play for audio of the content item to identify the focus elements.

4. The computer-implemented method of claim 1, further comprising:
    searching for a legend associated with the content item; and
    using the legend to generate the components of the graph.

5. The computer-implemented method of claim 1, further comprising:
    storing a time duration for each artifact indicating how long a focus of the consumer stays on that artifact; and
    identifying an additional focus element as an artifact for which the time duration reached the predefined threshold amount of time.

6. The computer-implemented method of claim 1, wherein a Software as a Service (SaaS) is configured to perform method operations.

7. A computer program product, the computer program product comprising a computer readable storage medium having program code embodied therewith, the program code executable by at least one processor to perform:
    identifying key concepts of a content item using text analysis, wherein the key concepts comprise topics;
    storing a time duration for each text string indicating how long a focus of a consumer stays on that text string;
    identifying focus elements that are focused on by the consumer, wherein the focus elements comprise text strings for which the time duration reached a predefined threshold amount of time;
    comparing the key concepts with the focus elements to identify overlapping elements;
    generating a graph comprising components with the overlapping elements, wherein the graph reflects understanding of the content item from a perspective of the consumer;
    modifying the components based on component identifiers, wherein the component identifiers are any of shapes and colors for the components; and
    providing the graph and the content item to one or more users.

8. The computer program product of claim 7, wherein the program code is executable by the at least one processor to perform:
    in response to the consumer being a reader, tracking eye focus of the reader to identify the focus elements.

9. The computer program product of claim 7, wherein the program code is executable by the at least one processor to perform:

in response to the consumer being a listener, tracking use of pause, rewind, and play for audio of the content item to identify the focus elements.

10. The computer program product of claim 7, wherein the program code is executable by the at least one processor to perform:
searching for a legend associated with the content item; and
using the legend to generate the components of the graph.

11. The computer program product of claim 7, wherein the program code is executable by the at least one processor to perform:
storing a time duration for each artifact indicating how long a focus of the consumer stays on that artifact; and
identifying an additional focus element as an artifact for which the time duration reached the predefined threshold amount of time.

12. The computer program product of claim 7, wherein a Software as a Service (SaaS) is configured to perform computer program product operations.

13. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more memories, to perform operations comprising:
identifying key concepts of a content item using text analysis, wherein the key concepts comprise topics;
storing a time duration for each text string indicating how long a focus of a consumer stays on that text string;
identifying focus elements that are focused on by the consumer wherein the focus elements comprise text strings for which the time duration reached a predefined threshold amount of time;
comparing the key concepts with the focus elements to identify overlapping elements;
generating a graph comprising components with the overlapping elements, wherein the graph reflects understanding of the content item from a perspective of the consumer;
modifying the components based on component identifiers, wherein the component identifiers are any of shapes and colors for the components; and
providing the graph and the content item to one or more users.

14. The computer system of claim 13, wherein the operations further comprise:
in response to the consumer being a reader, tracking eye focus of the reader to identify the focus elements.

15. The computer system of claim 13, wherein the operations further comprise:
in response to the consumer being a listener, tracking use of pause, rewind, and play for audio of the content item to identify the focus elements.

16. The computer system of claim 13, wherein the operations further comprise:
searching for a legend associated with the content item; and
using the legend to generate the components of the graph.

17. The computer system of claim 13, wherein the operations further comprise:
storing a time duration for each artifact indicating how long a focus of the consumer stays on that artifact; and
identifying an additional focus element as an artifact for which the time duration reached the predefined threshold amount of time.

18. The computer system of claim 13, wherein a Software as a Service (SaaS) is configured to perform computer system operations.

* * * * *